United States Patent

Okinoshima et al.

[11] Patent Number: 6,069,201
[45] Date of Patent: May 30, 2000

[54] ZINC OXIDE-FILLED ADDITION-CURABLE SILICONE RUBBER COMPOSITIONS

[75] Inventors: Hiroshige Okinoshima; Tsutomu Kashiwagi, both of Annaka, Japan

[73] Assignee: Shin-Etsu Chemical Co., Ltd., Tokyo, Japan

[21] Appl. No.: 09/152,075

[22] Filed: Sep. 11, 1998

[30] Foreign Application Priority Data

Sep. 12, 1997 [JP] Japan .................................. 9-267980
Jul. 17, 1998 [JP] Japan .................................. 10-253348

[51] Int. Cl.$^7$ ..................................................... C08J 3/22
[52] U.S. Cl. ........................ 524/783; 523/212; 524/404; 524/428; 524/432; 524/440; 524/781; 524/785; 524/786; 524/787
[58] Field of Search ............................ 523/212; 524/404, 524/428, 440, 781, 785, 786, 787, 432, 783

[56] References Cited

U.S. PATENT DOCUMENTS 5,021,494   6/1991   Toya ........................................ 524/404
5,051,467   9/1991   Okinoshima et al. ................... 524/731
5,504,174   4/1996   Onishi ...................................... 528/15

*Primary Examiner*—Robert Dawson
*Assistant Examiner*—Jeffrey B. Robertson
*Attorney, Agent, or Firm*—Oblon, Spivak, McClelland, Maier & Neustadt, P.C.

[57] ABSTRACT

A zinc oxide-filled addition-curable silicone rubber composition comprises (A) a diorganopolysiloxane containing at least two alkenyl groups in its molecule, (B) an organohydrogenpolysiloxane containing at least two hydrogen atoms bonded to silicon atoms in its molecule, (C) a platinum family metal catalyst, and (D) a zinc oxide powder surface treated with a tetraalkoxy silane and/or a partial hydrolysis-condensation product thereof. The composition can further comprise (E) a high thermal-conductive filler. The composition scarcely generates hydrogen gas during storage so as to have an excellent storage stability and provides a cured product excellent in heat resistance, electrical insulating properties, and adhesion to various metals, semiconductors, etc. while keeping good physical properties as a rubber. Further, the composition is easy to deal with and provides a cured product with a high thermal-conductivity and also excellent mechanical properties without lowering adhesion and requiring redispersia compoundven when filled with a high thermal-conductive filler.

9 Claims, No Drawings

ZINC OXIDE-FILLED ADDITION-CURABLE SILICONE RUBBER COMPOSITIONS

BACKGROUND OF THE INVENTION

1. Field of the Invention

The present invention relates to a zinc oxide-filled addition-curable silicone rubber composition having an excellent storage stability and being practical, a zinc oxide-filled addition-curable silicone rubber composition having a high thermal-conductivity, and cured products thereof.

2. Description of the Prior Art

It is known that silicone rubber compositions are filled with zinc oxide in order to, for example, accelerate curing and improve the heat resistance and electrical insulation properties of cured products thereof. Conventionally, the filling of zinc oxide is carried out for millable silicone rubber compositions which are crosslinked and cured by organic peroxides, and room temperature-curable (RTV) silicone rubber compositions which are crosslinked and cured by condensation reaction, but scarcely carried out for addition-curable silicone rubber compositions which are crosslinked and cured by addition reaction. This is because on filling zinc oxide in the addition-curable silicone rubber composition, an organohydrogenpolysiloxane contained as a crosslinking agent in the composition is reacted with the basic zinc oxide to generate hydrogen gas and because the composition foams during storage due to the hydrogen gas thus generated the inside pressure of a closed vessel in which the composition is contained increases to cause a danger of breakage of the vessel.

However, the addition-curable silicone composition, unlike the condensation-curable RTV silicone rubber composition, has advantages that it does not require a long time for curing and that polysiloxane as a constituent component does not undergo cleavage, so-called reversion, under the condition of elevated temperatures in a closed system. Thus, there is required an improvement in properties by filling with zinc oxide with the advantages above being retained.

Further, since the cured products (silicone rubber elastomers) of the conventional addition-curable silicone rubber compositions have an insufficient adhesion to various metals and semiconductors, such as nickel, aluminum, silicon and copper (particularly, copper and copper oxides), an improvement in adhesion is also required.

While, as a high thermal-conductive silicone rubber composition for providing a cured product with a high thermal-conductivity as well as physical properties such as excellent mechanical properties, there have hitherto been proposed many compositions filled with a variety of high thermal-conductive fillers, such as an aluminum powder, a copper powder, a nickel powder and an alumina powder [e.g., Japanese Patent Publication (kokoku) No.5-36456 corresponding to U.S. Pat. No. 5,021,494 and Japanese Pre-examination Patent Publication (kokai) No.8-295737 corresponding to U.S. application Ser. No. 08/427535 (filed on Apr. 24, 1995, now abandoned) which further contains zinc oxide].

However, since generally these high thermal-conductive fillers have a high specific gravity and a large particle size, it is difficult to uniformly disperse the filler in the composition and the filler is liable to cause separation or sedimentation with the lapse of time, so that the composition is required to be again stirred (redispersed) prior to use (cure). Furthermore, the filling of the filler in a large amount results in the problem that adhesion to substrates, especially such as metals and semiconductors, is lowered. Thus, there is required a silicone rubber composition easy to deal with, which provides a cured product with a high thermal-conductivity without lowering adhesion even when used in a large amount.

SUMMARY OF THE INVENTION

Accordingly, an object of the present invention is to provide a zinc oxide-filled addition-curable silicone rubber composition which is excellent in storage stability so as to scarcely generate hydrogen gas during storage and which is capable of giving a cured product excellent in heat resistance, electrical insulating properties, and adhesion to various metals, semiconductors, etc. with good physical properties as a rubber kept.

Another object of the present invention is to provide a zinc oxide-filled addition-curable silicone rubber composition easy to deal with, which even when filled with a high thermal-conductive filler, provides a cured product with a high thermal-conductivity as well as excellent mechanical properties without lowering adhesion and requiring redispersion.

The present invention provides a zinc oxide-filled addition-curable silicone rubber composition comprising:

(A) a diorganopolysiloxane containing at least two alkenyl groups in its molecule, (B) an organohydrogenpolysiloxane containing at least two hydrogen atoms bonded to silicon atoms in its molecule, (C) a platinum family metal catalyst, and (D) a zinc oxide powder surface-treated with at least one compound selected from the group consisting of a tetraalkoxy silane and a partial hydrolysis-condensation product of the tetraalkoxy silane;

and a cured product obtained by curing the composition.

Also, the present invention provides a zinc oxide-filled addition-curable silicone rubber composition having a high thermal-conductivity, further comprising (E) a high thermal-conductive filler; and a cured product obtained by curing the composition.

According to the present invention, the use of a zinc oxide surface-treated with a specified silane compound enables a zinc oxide-filled addition-curable silicone rubber composition which has a good shelf-stability and is practical. That is, the composition scarcely generates hydrogen gas during storage, in spite of containing zinc oxide. Furthermore, this composition can provide, after curing, a cured product showing excellent heat resistance and electrical insulating properties while keeping good physical properties as a rubber, such as hardness, tensile strength and elongation, as well as an excellent adhesion to various metals, semiconductors, etc., particularly even to copper and copper oxides to which adhesion has hitherto been hard. In addition, depending on the surface treatment methods for zinc oxide, rationalization by energy-saving and shortening of process time, etc. in the production processes of the composition can be expected.

Further in the composition of the present invention filled with a high thermal-conductive filler, the dispersibility of said filler due to the surface treated zinc oxide powder is improved and as a result, separation and sedimentation of the filler in the composition is prevented. Thus, it becomes easy to deal with the composition in curing and there can be provided a cured product showing excellent mechanical properties together with a high thermal-conductivity.

DETAILED DESCRIPTION OF THE PREFERRED EMBODIMENTS

The present invention will now be described in detail.

(A) Alkenyl Group-Containing Diorganopolysiloxanes

The alkenyl group-containing diorganopolysiloxane of component (A) is a compound containing at least two alkenyl groups bonded to silicon atoms in its molecule and is used as a base polymer in the composition of the present invention. Generally, the alkenyl group-containing diorganopolysiloxane is comprised basically of a backbone chain of repeating units of diorganosiloxane and is a linear polymer blocked with a triorganosiloxy group at both terminal ends of the molecular chain. However, the diorganopolysiloxane may contain a branched structure in part of the molecular structure or may be a cyclic structure in its entirety. Among them, preferred is a linear diorganopolysiloxane from the view point of the properties, such as mechanical strength, of a cured product. The alkenyl groups may be present only in both terminal ends of the molecular chain or may be present only in the course of the molecular chain (the parts of the molecular chain other than said both terminal ends). Typical examples of such an alkenyl group-containing diorganopolysiloxane include, for example, a diorganopolysiloxane represented by the following general formula (1):

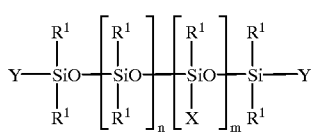

(1)

wherein $R^1$ is independently an unsubstituted or substituted monovalent hydrocarbon group free of aliphatic unsaturated bonds, X is an alkenyl group, Y is an alkenyl group or $R^1$, n is an integer of 0, 1 or more, and m is an integer of 0, 1 or more, provided that at least two alkenyl groups bonded to silicon atoms are present in the molecule.

In the general formula (1), the unsubstituted or substituted monovalent hydrocarbon group free of aliphatic unsaturated bonds includes, for example, an alkyl group, such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; a cycloalkyl group, such as a cyclopentyl group, a cyclohexyl group and a cycloheptyl group; an aryl group, such as a phenyl group, a tolyl group, a xylyl group, a naphthyl group and a biphenylyl group; an aralkyl group, such as a benzyl group, a phenylethyl group, a phenylpropyl group and a methylbenzyl group; and a group in which at least part of hydrogen atoms bonded to the carbon atoms of these groups has been substituted with a halogen atom, such as a fluorine atom, a chlorine atom and a bromine atom, or a cyano group or the like, e.g., a halogen-substituted alkyl group, a cyano-substituted alkyl group and a halogen-substituted aryl group, such as a chloromethyl group, a 2-bromoethyl group, a 3-chloropropyl group, a 3,3,3-trifluoropropyl group, a chlorophenyl group, a fluorophenyl group, a cyanoethyl group and a 3,3,4,4,5,5,6,6,6-nonafluorohexyl group. Typical $R^1$ groups include those having 1 to 10 carbon atoms, particularly 1 to 6 carbon atoms. Preferable $R^1$ groups include an unsubstituted or substituted alkyl group having 1 to 3 carbon atoms, such as a methyl group, an ethyl group, a propyl group, a chloromethyl group, bromoethyl group, a 3,3,3-trifluoropropyl group and a cyanoethyl group; and an unsubstituted or substituted phenyl group, such as a phenyl group, a chlorophenyl group and a fluorophenyl group.

In the general formula (1), the alkenyl group X includes, for example, an alkenyl group having generally 2 to about 8 carbon atoms, such as a vinyl group, an allyl group, a propenyl group, an isopropenyl group, a butenyl group, a hexenyl group, a cyclohexenyl group. Among them, preferred is a lower alkenyl group having 2 to 4 carbon atoms, such as a vinyl group and an allyl group.

In the general formula (1), Y is an alkenyl group or $R^1$. This alkenyl group includes the same groups as exemplified for said X. The $R^1$ has the same meaning as above, provided that preferably each of plural Y as a substituent bonded to silicon atoms present at both terminal ends of the molecule chain is an alkenyl group.

In the general formula (1), n is an integer of 0, 1 or more, and m is an integer of 0, 1 or more. Preferably, n and m are an integer satisfying $10 \leq n+m \leq 10,000$ and $0 \leq m/(m+n) \leq 0.2$, particularly an integer satisfying $50 \leq n+m \leq 2,000$ and $0 \leq m/(m+n) \leq 0.05$.

Further, preferably the alkenyl group-containing diorganopolysiloxane has a viscosity at 25° C. of 10 to about 1,000,000 cP, particularly 100 to about 500,000 cP.

(B) Organohydrogenpolysiloxane

The organohydrogenpolysiloxane of component (B) is a compound containing at least two, preferably 3 or more, hydrogen atoms bonded to silicon atoms (i.e., SiH groups) in its molecule and is used as a crosslinking agent. The organohydrogenpolysiloxane may be linear, branched or cyclic, or a resinous compound having three-dimensional network structures. Typical examples of such an organohydrogenpolysiloxane include an organohydrogenpolysiloxane represented by the following average compositional formula (2):

(2)

wherein $R^2$ is independently an unsubstituted or substituted monovalent hydrocarbon group free of aliphatic unsaturated bonds; a and b are a number satisfying $0<a<2$, $0.7 \leq b \leq 2$ and $0.8 \leq a+b \leq 3$, preferably $0.001 \leq a \leq 1.2$, $0.8 \leq b \leq 2$ and $1 \leq a+b \leq 2.7$, more preferably $0.01 \leq a \leq 1$, $1.5 \leq b \leq 2$ and $1.8 \leq a+b \leq 2.4$.

In the average compositional formula (2), the unsubstituted or substituted monovalent hydrocarbon group free of aliphatic unsaturated bonds of $R^2$ includes the same groups as exemplified for $R^1$ in the general formula (1). Typical $R^2$ groups include those having 1 to 10 carbon atoms, particularly 1 to 7 carbon atoms. Preferable $R^2$ groups include a lower alkyl group having 1 to 3 carbon atoms, such as a methyl group; a phenyl group; and a 3,3,3-trifluoropropyl group. Examples of the organohydrogenpolysiloxane include a siloxane oligomer, such as 1,1,3,3-tetramethyldisiloxane, 1,3,5,7-tetramethyltetracyclosiloxane, 1,3,5,7,8-pentamethylpentacyclosiloxane; a siloxane polymer, such as a methylhydrogenpolysiloxane blocked with a trimethylsiloxy group at both terminal ends of its molecular chain, a dimethylsiloxane/methylhydrogensiloxane copolymer blocked with a trimethylsiloxy group at both terminal ends of its molecular chain, a methylhydrogenpolysiloxane blocked with a silanol group at both terminal ends of its molecular chain, a dimethylsiloxane/methylhydrogensiloxane copolymer blocked with a silanol group at both terminal ends of its molecular chain, a dimethylpolysiloxane blocked with a dimethylhydrogensiloxy group at both terminal ends of its molecular chain, a methylhydrogenpolysiloxane blocked with a dimethylhydrogensiloxy group at both terminal ends of its molecular chain, a dimethylsiloxane/methylhydrogensiloxane copolymer blocked with a dimethylhydrogensiloxy group at both terminal ends of its molecular chain, a dimethylsiloxane/diphenylsiloxane/methylhydrogensiloxane compolymer blocked with a trimethylsiloxy group at both terminal ends of its molecular chain, a dimethylsiloxane/diphenylsiloxane/methylhydrogensiloxane compolymer blocked with a dimethylhydrogensiloxy group at both terminal ends of its molecular chain; and a silicone resin comprised of a $R_2(H)SiO_{1/2}$ unit, a $SiO_{4/2}$ unit, and optionally a unit selected from the group consisting of a $R_3SiO_{1/2}$ unit, a $R_2SiO_{2/2}$ unit, a $R(H)SiO_{2/2}$ unit, a $(H)SiO_{3/2}$ unit or a $RSiO_{3/2}$ unit, wherein in these formulas, R is the same groups as exemplified for the unsubstituted or substituted monovalent hydrocarbon group of said $R^1$. Further, examples of the organohydrogenpolysiloxane include those represented by the following formulas:

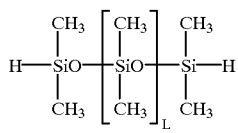

wherein L is an integer of 1 to 200,

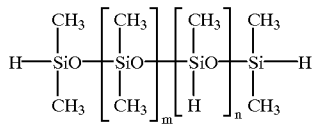

wherein m is an integer of 0 to 100, and n is an integer of 1 to 100;

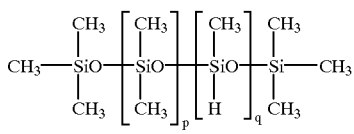

wherein p is an integer of 0 to 100, and q is an integer of 2 to 100, preferably 3 to 100;

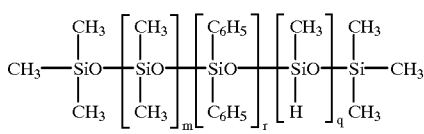

wherein m is an integer of 0 to 100, q is an integer of 2 to 100, preferably 3 to 100, and r is an integer of 1 to 50;

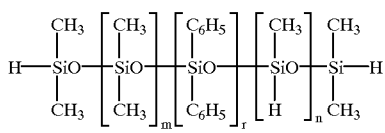

wherein m is an integer of 0 to 100, n is an integer of 1 to 100, and r is an integer of 1 to 50;

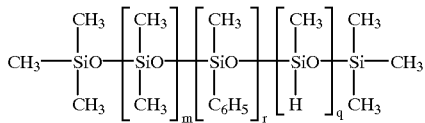

wherein m is an integer of 0 to 100, q is an integer of 2 to 100, preferably 3 to 100, and r is an integer of 1 to 50;

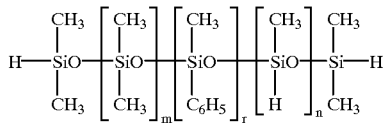

wherein m is an integer of 0 to 100, n is an integer of 1 to 100, and r is an integer of 1 to 50;

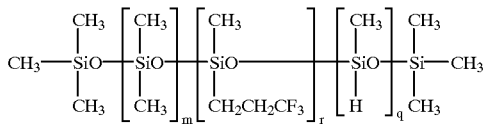

wherein m is an integer of 0 to 100, q is an integer of 2 to 100, preferably 3 to 100, and r is an integer of 1 to 50; and

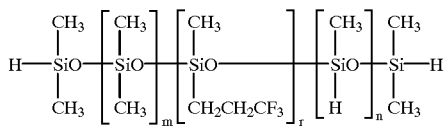

wherein m is an integer of 0 to 100, n is an integer of 1 to 100, and r is an integer of 1 to 50.

The organohydrogenpolysiloxane of component (B) suitably used has a viscosity at 25° C. of 0.2 to about 1,000 cP, particularly 0.5 to about 500 cP.

The organohydrogenpolysiloxane of component (B) can be prepared by the conventionally known methods. For example, it can be prepared either by cohydrolyzing at least one chlorosilane selected from the group consisting of compounds represented by the following general formulas (3) and (4):

$$R^2 SiHCl_2 \qquad (3),$$

and

$$R^2{}_2 SiHCl \qquad (4)$$

wherein $R^2$ is as defined in said average compositional formula (2), or its alkoxy derivative (e.g., methoxy derivative); or by cohydrolyzing said chlorosilane or its alkoxy derivative together with at least one chlorosilane selected from the group consisting of compounds represented by the following formulas (5) and (6):

$$R^2{}_3 SiCl \qquad (5),$$

and

$$R^2{}_2 SiCl_2 \qquad (6)$$

wherein $R^2$ is as defined above, or its alkoxy derivative (e.g., methoxy derivative). The organohydrogenpolysiloxane may be prepared by subjecting the polysiloxane obtained by said cohydrolysis to equilibration reaction.

The amount of component (B) used is such an amount that the silicon-bonded hydrogen atoms (i.e., SiH groups) contained in the organohydrogenpolysiloxane of component (B) are generally 0.5 to 5 mole, preferably 1 to 2.5 mole, per mole of the alkenyl groups contained in the alkenyl group-containing diorganopolysiloxane of component (A).

(C) Platinum Family Metal Catalysts

The platinum family metal catalyst of component (C) is a catalyst for accelerating the addition reaction (hydrosilylation reaction) of the alkenyl groups contained in the component (A) with the SiH groups contained in the component (B). As the platinum family metal catalyst, there can be used the well known catalysts for hydrosilylation reaction. Specific examples thereof include a platinum family metal single substance, such as platinum (including platinum black), rhodium and palladium; platinum chloride, chloroplatinic acid and salts of chloroplatinic acid, such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $NaHPtCl_4 \cdot nH_2O$ wherein, in these formulas, n is an integer of 0 to 6, preferably 0 or 6; an alcohol-modified chloroplatinic acid (see U.S. Pat. No. 3,220,972); a complex of chloroplatinic acid with an olefin (see U.S. Pat. Nos. 3,159,601; 3,159,662; and 3,775,452); a catalyst comprising a platinum family metal, such as platinum black and palladium, supported on a carrier, such as alumina, silica and carbon; a rhodium-olefin complex; chlorotris(triphenylphosfine)rhodium (Wilkinson's catalyst); a complex of platinum chloride, chloroplatinic acid or chloroplatinic acid salt with a vinyl group-containing siloxane, particularly a vinyl group-containing cyclosiloxane; and the like.

The amount of component (C) may be a so-called catalytic amount and generally may be 0.1 to about 1,000 ppm, particularly 0.5 to about 500 ppm, in terms of the weight of platinum family metal, based on the total weight of the components (A) and (B).

(D) Zinc Oxide Powders Surface-Treated With a Tetraalkoxysilane and/or a Partial Hydrolysis-Condensation Product of the Tetraalkoxysilane The surface treated zinc oxide powder of component (D) may be those prepared by surface-treating a zinc oxide powder with at least one silane compound selected from the group consisting of a tetraalkoxysilane and/or a partial hydrolysis-condensation product of the tetraalkoxysilane. The component (D) is a component for providing a cured product with properties, mainly such as heat resistance, electrical insulating properties and adhesion, or for enhancing these properties of the cured product.

In the addition-curable silicone rubber composition filled with the surface treated zinc oxide powder as above, the dehydrogenation reaction of organohydrogenpolysiloxane ascribable to the basic property of zinc oxide per se is lowered and foaming during storage or in curing as well as the breakage of a vessel during storage are prevented. Further, in the case of the addition-curable silicone rubber composition filled with the surface treated zinc oxide powder and, in addition thereto, a high thermal-conductive filler, since the surface treated zinc oxide powder enables the high thermal-conductive filler to disperse uniformly and stably in the composition for a long time, separation and sedimentation does not occur with the lapse of time, not to speak of during the production. Thus, there is no need to stir and redisperse the composition filled with the high thermal-conductive filler prior to use, whereby the curing step is simplified.

(a) Tetraalkoxysilanes and/or partial hydrolysis-condensation products of the tetraalkoxysilanes:

The tetraalkoxysilane used in the surface treatment of a zinc oxide powder is represented by the following general formula (7):

$$Si(OR^3)_4 \qquad (7)$$

wherein $R^3$ is independently an unsubstituted or lower-alkoxy-substituted alkyl group.

In the general formula (7), the unsubstituted or lower-alkoxy-substituted alkyl group of $R^3$ includes, for example, alkyl groups having generally 1 to about 12, preferably 1 to about 6, carbon atoms, such as a methyl group, an ethyl group, a propyl group, an isopropyl group, a butyl group, an isobutyl group, a tert-butyl group, a pentyl group, a neo-pentyl group, a hexyl group, a heptyl group, an octyl group, a nonyl group, a decyl group, a dodecyl group, a methoxymethyl group, a methoxyethyl group, an ethoxymethyl group and a ethoxyethyl group.

The partial hydrolysis-condensation product of the tetraalkoxysilane includes, for example, compounds represented by the following average compositional formula (8):

$$[(OR^3)_3SiO_{1/2}]_K[(OR^3)_2SiO_{2/2}]_L[(OR^3)SiO_{3/2}]_M[SiO_{4/2}]_N \qquad (8)$$

wherein $R^3$ is as defined in said general formula (7), and K, L, M and N are numbers satisfying $K+L+M+N=1$, $0.002 \leq K \leq 1$, $0 \leq L \leq 0.998$, $0 \leq M \leq 0.998$ and $0 \leq N \leq 0.35$. A particularly typical condensation product includes compounds represented by the following general formula (9):

$$R^3O\text{---}[Si(OR^3)_2O]_j\text{---}R^3 \qquad (9)$$

wherein $R^3$ is as defined above, j is an integer of 2 or more, preferably 2 to 1,000, more preferably 2 to 200. The partial hydrolysis-condensation product of the tetraalkoxysilane has a weight-average molecular weight in terms of polystyrene of preferably 150 to 100,000, more preferably 200 to 20,000.

In the use of the surface treating agent, one or more tetraalkoxysilanes may be used alone, or one or more partial hydrolysis-condensation products of the tetraalkoxysilane may be used alone, or a tetraalkoxysilane may be used in combination with a partial hydrolysis-condensation product of the tetraalkoxysilane at any ratio.

(b) Zinc oxide:

As the zinc oxide powder, although any known zinc oxide powder can be used, preferred is a zinc oxide powder having a purity of 99.5 wt. % or more defined as 1st grade in JIS K 1410). The average particle size of the zinc oxide powder may be generally 0.05 to about 10 μm, preferably 0.1 to about 5 μm, and can be suitably selected depending on uses.

The average particle size can be normally measured as a weight-average value (median diameter) or the like by using a particle size distribution-measuring apparatus according to, for example, the laser beam diffraction method.

(c) Surface treatment:

As methods for the surface treatment, there can be used the known wet treatments or dry treatments. Specific examples of these surface treatments include a method comprising dissolving or dispersing a tetraalkoxysilane and/or a partial hydrolysis-condensation product of the tetraalkoxysilane in a suitable solvent, mixing the solution or dispersion with a zinc oxide powder and then heating and drying the mixture. Said solvent includes, for example, toluene and xylene. The heating and drying may be conducted, for example, at 80 to 200° C. for 0.5 to about 10 hours.

Other methods for the surface treatments include a method comprising mixing at least part (generally 30 weight % or more, particularly 50 weight % or more) of component (A), a zinc oxide powder, a tetraalkoxysilane and/or a partial hydrolysis-condensation product of the tetraalkoxysilane, and then heat treating the mixture. The heat treatment may be conducted, for example, at 80 to 200° C. for 0.5 to about 10 hours. This method for the surface-treatment comprising mixing a zinc oxide powder and a tetraalkoxysilane and/or a partial hydrolysis-condensation product of the tetraalkoxysilane with at least part of component (A) does not need the steps of adding a solvent and then drying the same and can effect the surface treatment of a zinc oxide powder simultaneously at the step of mixing or kneading all the components used in the production of the composition according to the present invention as mentioned later. Thus, the method is preferred because rationalization can be expected in respect of energy-saving and shortening of process time, for instance.

The amount of a tetraalkoxysilane and/or a partial hydrolysis-condensation product of the tetraalkoxysilane used in the surface treatment can be suitably adjusted in accordance with the specific surface area and other properties of the zinc oxide powder used. Generally it may be 0.1 to 20 parts by weight per 100 parts by weight of the zinc oxide powder. By the above surface treatment, a siloxane film is formed on the zinc oxide powder to thereby prevent the basic property of the zinc oxide from affecting the organohydrogenpolysiloxane.

The amount of the surface treated zinc oxide powder of component (D) used is generally 5 to 300 parts by weight, preferably 10 to 200 parts by weight, per 100 parts by weight of the alkenyl group-containing diorganopolysiloxane of component (A). If the amount used is too small, the basic property of the zinc oxide powder may affect the organohydrogenpolysiloxane and the adhesion effect is lowered. Furthermore, in the case of the composition filled with a high thermal-conductive filler, the preventive effect on the separation and sedimentation of the high thermal-conductive filler in the composition may be lowered. While, if the amount is too large, the viscosity of the composition may be increased to lower flowability.

(E) High Thermal-Conductive Fillers

The high thermal-conductive filler of component (E) is an optional component which is mixed in the composition of the present invention comprising the components (A) to (D), and is a component providing a cured product of the composition according to the present invention with a high thermal conductivity as well as excellent mechanical properties. The high thermal-conductive filler is an inorganic filler having a thermal conductivity of $1\times10^{-3}$ cal/cm.sec.°C. or more, preferably $1\times10^{-2}$ cal/cm.sec.°C. or more and includes, for example, ceramics fillers, such as an alumina powder, a boron nitride powder, an aluminum nitride powder, a silicon carbide powder and a silicon nitride powder; and metal powders, such as an aluminum powder, a copper powder and a nickel powder. Among them, preferred are ceramics powders from the view point of, for example, heat-radiating properties and electrical insulating properties.

The amount of the high thermal-conductive filler used is 0 to 1,000 parts by weight, generally 10 to 1,000 parts by weight, preferably 20 to 800 parts by weight, per 100 parts by weight of the alkenyl group-containing diorganopolysiloxane of component (A). If the amount used is too small, the high thermal-conductivity of the resulting cured product may be insufficient, while if it is too large, the viscosity of the composition may be increased to lower flowability.

Other Components

To the composition of the present invention, in addition to the components (A) to (D) or the components (A) to (E), there can be optionally added various additives which are conventionally used. These additives include, for example, a reinforcing inorganic filler, such as fumed silica and fumed titanium dioxide; and a non-reinforcing filler, such as calcium silicate, titanium dioxide, ferric oxide and carbon black. The amount of these optional inorganic fillers is generally 0 to 200 parts by weight per 100 parts by weight of the total amount of the components (A) to (D).

Also, particularly in the case where the composition is provided as one-pack, a cure-retarder such as acetylene alcohol can be added. The amount of the cure-retarder added is generally 0 to 10 parts by weight per 100 parts by weight of the total amount of the components (A) to (D).

Further for the purpose of improving the adhesion of the composition, there can be optionally added an epoxy group-containing polysiloxane compound and/or an ester siloxane compound (i.e., an organosiloxane compound containing no silicon-carbon bonding in its molecule in which all the monovalent groups or atoms bonded to silicon atoms are alkoxy groups or hydrogen atoms). The amount of these siloxane compounds is generally 0 to 10 parts by weight per 100 parts by weight of the total amount of the components (A) to (D).

Zinc Oxide-Filled Addition-Curable Silicone Rubber Compositions, and Cured Products and Uses Thereof The composition is obtained basically by mixing or kneading said components (A) to (D) and, optionally, the component (E) and/or additives. However, the composition may be provided as a so-called two-pack type composition in which the components are divided into two-packs as in the conventional addition-curable silicone rubber compositions. That is, for example, the composition is prepared as a set of the first pack consisting of part of component (A), component (C), component (D) and, optionally, component (E) and/or an inorganic filler (as an additive, the same being applied in this paragraph) and the second pack consisting of the remainder of component (A) and component (B), and prior to use these two packs are mixed to cure. Another two-pack type composition may be another set of two packs, the first pack thereof being prepared by heat treating at least part of component (A), a zinc oxide powder, a tetraalkoxysilane and/or a partial hydrolysis-condensation product of the tetraalkoxysilane, and, optionally, component (E) and/or an inorganic filler, as mentioned above, to produce a heat treated mixture, and the second pack thereof being prepared by mixing the remaining components to produce a mixture thereof. In addition, the composition may be provided as a so-called one-pack type composition prepared by mixing the components (A) to (D) and, optionally, the component (E) and/or an inorganic filler, and then adding thereto a small amount of a cure-retarder (e.g., acetylene alcohol).

The cured product of the present invention is obtained by curing said composition. The curing conditions may be the same as in the known addition-curable silicone rubber compositions. For example, curing proceeds satisfactorily even at normal (room) temperatures but, if necessary, may be effected by heating.

The cured product of the present invention thus obtained exhibits good physical properties (hardness, tensile strength, elongation, etc.) as a rubber, an excellent heat resistance and excellent electrical insulating properties and an excellent adhesion to various metals, semiconductors, etc., particularly copper and copper oxides. Further, the cured product filled with a high thermal-conductive filler exhibits excellent mechanical properties as well as a high thermal-conductivity. Thus, the cured product of the present invention can be used as a heat-radiating sheet, an electrical insulating sheet, etc. for electrical or electronic parts; a sealant (potting agent) for semiconductor elements; adhesives; a protective coating; etc.

EXAMPLES

Example 1

90 parts by weight of a vinyl group-containing linear dimethylpolysiloxane represented by the following formula (10):

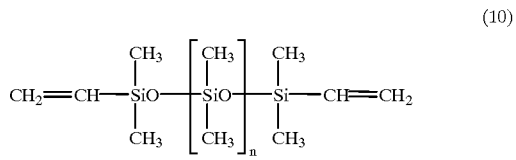

(10)

wherein n is a number such that the viscosity at 25° C. of the siloxane is 5,000 cP, 10 parts by weight of a vinyl group-containing linear dimethylpolysiloxane represented by said general formula (10) wherein n is a number such that the viscosity at 25° C. of the siloxane is 100,000 cP, 100 parts by weight of a zinc oxide having a purity of 99.5 wt. % or more defined as 1st grade in JIS K 1410 (average particle size: 0.3 μm) (produced by Mitsui Mining & Smelting Co., Ltd.) and 2 parts by weight of tetraethoxysilane were kneaded on a three-roll mill and thereafter the kneaded product was further kneaded using a planetary mixer at 160° C. for 3 hours. Subsequently, 2 parts by weight of a methylhydrogenpolysiloxane (content of SiH groups: 0.7 mole/100 g) [molar ratio of SiH groups (hydrogen atoms bonded to silicon atoms) contained in the component (B) to vinyl groups contained in the component (A) being 2.5] and 0.02 part by weight of a solution (content in terms of platinum metal: 2% by weight) of an octylalcohol-modified chloroplatinic acid were added to the kneaded product, followed by stirring to obtain an addition-curable silicone rubber composition. On measuring the viscosity (viscosity at 25° C., the same being applied hereinafter) of the composition using a B-type rotary viscometer, it was 275 P (poise).

Then, the resulting composition was measured for the electrical conductance of extracted water, the amount of hydrogen gas generated, the physical properties (hardness, tensile strength, and elongation) as a rubber, and the electrical properties (volume resistivity), adhesion and heat resistance of a cured product in accordance with the following methods and further was observed for the state of foaming. The results are shown in Table 1.

Electrical Conductance of Extracted Water 20 parts by weight of the above composition, 40 parts by weight of guaranteed toluene and 100 parts by weight of pure water were charged into a separatory funnel. The funnel was shaken for 1 hour and left to stand for separation of water phase. The electrical conductance (μS/cm) of the water dispensed from the water phase was measured by a conductometer.

Amount of Hydrogen Gas Generated 5 g of the above composition was placed in a 500 ml-headspace bottle, which was then closed tightly and left to stand at a room temperature for 48 hours. Thereafter, the amount of hydrogen gas generated in the bottle was measured by gas chromatography.

Physical Properties as a Rubber of a Cured Product

The above composition was cast in a metal mold having a size of 150 mm×100 mm×2 mm and defoamed in vacuum, followed by heating at 150° C. for 4 hours to obtain a cured product in a sheet. The cured product was measured for physical properties (hardness, tensile strength and elongation) as a rubber according to JIS K 6301. Incidentally, the hardness was measured using a spring hardness tester type A.

Electrical Properties of a Cured Product

The above composition was cast in a metal mold having a size of 150 mm×100 mm×1 mm and defoamed in vacuum, followed by heating at 150° C. for 4 hours to obtain a cured product in a sheet. The cured product was measured for volume resistivity according to JIS C 2123.

Heat Resistance of a Cured Product

The same cured sheet product as used in said measurement of physical properties as a rubber was heated at 250° C. for 24 hours or 48 hours and measured for hardness according to JIS K 6301 using a spring hardness tester type A.

Adhesion of a Cured Product

The above composition was cast on each of substrates having a size of 150 mm×100 mm×1 mm for use in electrical and electronic parts, said substrates being made of nickel, aluminum, silicon, copper or an acid-etched copper. The substrate cast was defoamed in vacuum, followed by heating at 150° C. for 4 hours to obtain a cured product in a sheet. The resulting cured product was peeled off from the substrate using a micro spatula. The ratio (area ratio) of the portions of cohesive failure (portions broken at the section of the cured product) to the portions of interfacial peeling (portions broken at the interface between the cured product and the substrate) was measured to evaluate adhesion according to the following criteria.

◯: The rate of cohesive failure is more than 80%, indicating good adhesion.

Δ: The rate of cohesive failure is in the range of 20 to 80%, indicating adhesion.

X: The rate of cohesive failure is less than 20%, indicating almost no adhesion (i.e., easy to peel off).

States of Foaming of a Cured Product

The same cured product in a sheet as used in said measurement of physical properties as a rubber was observed with naked eyes for foaming or no foaming.

Example 2

An addition-curable silicone rubber composition was prepared in the same manner as in Example 1, except that tetraethoxysilane was replaced with 2 parts by weight of a partial hydrolysis-condensation product ($SiO_{4/2}$ unit content: 40% by weight; tradename: Ethylpolysilicate 40T produced by Colcoat Co., Ltd.) of tetraethoxysilane. On measuring the viscosity of the composition using a B-type rotary viscometer, it was 233 P (poise).

Then, the resulting composition was measured for a variety of properties according to the methods set forth in Example 1. The results are shown in Table 1.

Example 3

An addition-curable silicone rubber composition was prepared in the same manner as in Example 1, except that tetraethoxysilane was replaced with 2 parts by weight of a partial hydrolysis-condensation product [weight-average molecular weight (Mw): 788] of tetramethoxysilane. On measuring the viscosity of the composition using a B-type rotary viscometer, it was 246 P (poise).

Then, the resulting composition was measured for a variety of properties according to the measuring methods set forth in Example 1. The results are shown in Table 1.

Example 4

An addition-curable silicone rubber composition was prepared in the same manner as in Example 1, except that the amount (2 parts by weight) of methylhydrogenpolysiloxane was changed to 1 part by weight and that 1 part by weight of an epoxy group-containing methylhydrogenpolysiloxane represented by the following formula:

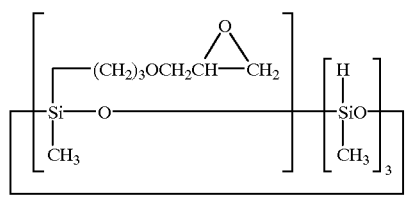

was further added. On measuring the viscosity of the composition using a B-type rotary viscometer, it was 260 P (poise).

Then, the resulting composition was measured for a variety of properties according to the measuring methods set forth in Example 1. The results are shown in Table 1.

Comparative Example 1

An addition-curable silicone rubber composition was prepared in the same manner as in Example 1, except that tetraethoxysilane was replaced with 28 parts by weight of a siloxysilazane compound represented by the following formula:

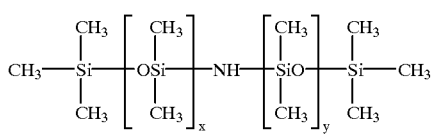

wherein x and y are numbers such that x+y is 30 on average. On measuring the viscosity of the composition using a B-type rotary viscometer, it was 155 P (poise).

Then, the resulting composition was measured for a variety of properties according to the measuring methods set forth in Example 1. The results are shown in Table 2.

Comparative Example 2

An addition-curable silicone rubber composition was prepared in the same manner as in Example 1, except that tetraethoxysilane was replaced with 3 parts by weight of hexamethyldisilazane. On measuring the viscosity of the composition using a B-type rotary viscometer, it was 280 P (poise).

Then, the resulting composition was measured for a variety of properties according to the measuring methods set forth in Example 1. The results are shown in Table 2.

Comparative Example 3

An addition-curable silicone rubber composition was prepared in the same manner as in Example 1, except that tetraethoxysilane was replaced with 2 parts by weight of triethoxymethylsilane. On measuring the viscosity of the composition using a B-type rotary viscometer, it was 283 P (poise).

Then, the resulting composition was measured for a variety of properties according to the measuring methods set forth in Example 1. The results are shown in Table 2.

Comparative Example 4

An addition-curable silicone rubber composition was prepared in the same manner as in Example 1, except that zinc oxide was not used. On measuring the viscosity of the composition using a B-type rotary viscometer, it was 40 P (poise).

Then, the resulting composition was measured for a variety of properties according to the measuring methods set forth in Example 1. The results are shown in Table 2.

TABLE 1

|  | Example 1 | Example 2 | Example 3 | Example 4 |
|---|---|---|---|---|
| Viscosity (P) | 275 | 233 | 246 | 260 |
| Electrical conductance of extracted water ($\mu$s/cm) | 2 | 2 | 2 | 2 |
| Amount of $H_2$ gas generated ($\mu$l/g) | 21 | 19 | 20 | 21 |
| Hardness (JIS-A) | 49 | 47 | 47 | 48 |
| Tensile strength (kgf/cm$^2$) | 52 | 45 | 50 | 50 |
| Elongation (%) | 155 | 140 | 145 | 150 |
| Volume resistivity ($\Omega$ cm) | $1 \times 10^{16}$ | $9 \times 10^{15}$ | $8 \times 10^{15}$ | $1 \times 10^{16}$ |
| Heat resistance |  |  |  |  |
| Hardness after 250° C./24 hr | 57 | 57 | 57 | 56 |
| Hardness after 250° C./72 hr | 66 | 65 | 67 | 66 |
| Foaming | None | None | None | None |
| Adhesion (after 150° C./4 hr) |  |  |  |  |
| To Ni | ○ | ○ | ○ | ○ |
| To Al | ○ | ○ | ○ | ○ |
| To Si | ○ | ○ | ○ | ○ |
| To Cu | ○ | ○ | ○ | ○ |
| To acid-etched Cu | ○ | ○ | ○ | ○ |

TABLE 2

|  | Com. Ex.1 | Com. Ex. 2 | Com. Ex. 3 | Com. Ex. 4 |
|---|---|---|---|---|
| Viscosity (P) | 155 | 280 | 283 | 40 |
| Electrical conductance of extracted water ($\mu$s/cm) | 2 | 3 | 3 | 2 |
| Amount of $H_2$ gas generated ($\mu$l/g) | 20 | 100 | 120 | 10 |
| Hardness (JIS-A) | 35 | 47 | 47 | 19 |
| Tensile strength (kgf/cm$^2$) | 20 | 51 | 50 | 5 |
| Elongation (%) | 160 | 170 | 150 | 200 |
| Volume resistivity ($\Omega$ cm) | $5 \times 10^{15}$ | $7 \times 10^{15}$ | $8 \times 10^{15}$ | $7 \times 10^{14}$ |
| Heat resistance |  |  |  |  |
| Hardness after 250° C./24 hr | 45 | 57 | 57 | —* |
| Hardness after 250° C./72 hr | 55 | 69 | 69 | —* |

TABLE 2-continued

|  | Com. Ex.1 | Com. Ex. 2 | Com. Ex. 3 | Com. Ex. 4 |
|---|---|---|---|---|
| Foaming | Occurred | Occurred | Slightly occurred | None |
| Adhesion (after 150° C./4 hr) |  |  |  |  |
| To Ni | x | x | x | ○ |
| To Al | x | x | x | ○ |
| To Si | Δ | x | Δ | ○ |
| To Cu | x | x | x | x |
| To acid-etched Cu | x | x | x | x |

*Measurement was impossible due to the generation of cracking.

Example 5

100 parts by weight of a vinyl group-containing linear dimethylpolysiloxane represented by the following formula:

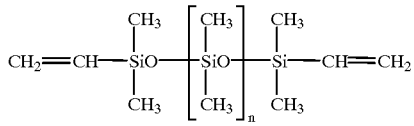

wherein n is a number such that the viscosity at 25° C. of the siloxane is 1,000 cP, 100 parts by weight of a zinc oxide defined as 1st grade in JIS K 1410 having an average particle size of 0.3 μm (produced by Mitsui Mining & Smelting Co., Ltd.) and 2 parts by weight of a partial hydrolysis-condensation product ($SiO_{4/2}$ unit content: 40% by weight; Ethylpolysilicate 40T produced by Colcoat Co., Ltd.) of tetraethoxysilane were kneaded on a three-roll mill and thereafter the kneaded product was further kneaded using a planetary mixer at 160° C. for 3 hours. Subsequently, 500 parts by weight of an alumina powder (AO 41R produced by Adomatechs Co., Ltd.; average particle size: 11 μm) was added to the kneaded product, followed by kneading again by the planetary mixer for 1 hour. Thereafter, 4 parts by weight of a methylhydrogenpolysiloxane [content of SiH groups: 0.7 mole/100 g] [molar ratio of SiH groups contained in the component (B) to vinyl groups contained in the component (A) being 2.2], 0.02 part by weight of a solution (content in terms of platinum metal: 2% by weight) of an octylalcohol-modified chloroplatinic acid, and 0.02 part by weight of acetylene alcohol (OLFINE B, produced by Nissin Chemical Industry Co., Ltd.) were added thereto, followed by stirring to obtain an addition-curable silicone rubber composition. On measuring the viscosity of the composition using a B-type rotary viscometer, it was 600 P (poise). Further, the resulting composition was observed for the state of sedimentation and separation of the filler contained therein with the lapse of time and measured for the physical properties (hardness, tensile strength, and elongation) as a cured rubber, the electrical properties (volume resistivity, dielectric breakdown, dielectric constant, and dielectric dissipation factor), adhesion and thermal conductivity of a cured product, and the amount of hydrogen gas generated in the composition. Incidentally, the methods for measuring the physical properties as a cured rubber and the amount of hydrogen gas generated in the composition are as described in Example 1. Also, the method for measuring the electrical properties of a cured product is the same as the method for measuring the electrical properties described in Example 1 (although the measuring method for the electrical properties according to JIS C 2123 described in Example 1 is concerned only with volume resistivity, the method according to JIS C 2123 is also applied for the measurement of dielectric breakdown, dielectric constant, and dielectric dissipation factor.). The results are shown in Table 3.

The State of Sedimentation and Separation of the Filler

According to the method defined in ASTM E 1530 and specifically, the above composition was visually observed for the state of sedimentation and separation of the filler after being stored at 5° C. for 7 days, 15 days, 30 days or 60 days.

Thermal Conductivity

The above composition was charged in a cylindrical vessel having a diameter of 5.0 mm and a thickness of 9 mm and heated at 150° C. for 4 hours to produce a cylindrical cured product. The cured product, as a specimen, was laid between an upper heater plate (low-temperature side) and a lower heater plate (high-temperature side) in close contact therewith. After each of these heater plates was heated to reach a constant temperature, the difference in temperature between both surfaces of the specimen and a heat flow rate (heat flux) Q/A wherein Q is an amount thermally conducted (cal/sec) and A is a cross sectional area ($cm^2$) of the specimen was measured to calculate a thermal conductivity λ (cal/cm.sec.°C.) from the following equation:

$$\lambda = (Q \cdot L)/(A \cdot \Delta T)$$

wherein Q and A are as defined above, L is a length (cm) of the specimen, and ΔT is the difference (°C.) in temperature between both surfaces of the specimen.

Comparative Example 5

An addition-curable silicone rubber composition was prepared in the same manner as in Example 5, except that Ethylpolysilicate 40T was not used and accordingly the zinc oxide was not surface treated with the Ethylpolysilicate. On measuring the viscosity of the composition using a B-type rotary viscometer, it was 760 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 4.

Comparative Example 6

An addition-curable silicone rubber composition was prepared in the same manner as in Example 5, except that zinc oxide and Ethylpolysilicate 40T were not used. On measuring the viscosity of the composition using a B-type rotary viscometer, it was 300 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 4.

Comparative Example 7

An addition-curable silicone rubber composition was prepared in the same manner as in Example 5, except that 100 parts by weight of zinc oxide was replaced with 10 parts by weight of a fumed silica (average particle size: 0.02 μm) surface-treated with hexamethyldisilazane. On measuring the viscosity of the composition using a B-type rotary viscometer, it was 720 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 4.

Example 6

An addition-curable silicone rubber composition was prepared in the same manner as in Example 5, except that Ethylpolysilicate 40T was replaced with tetraethoxysilane. On measuring the viscosity of the composition using a B-type rotary viscometer, it was 720 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 3.

Example 7

An addition-curable silicone rubber composition was prepared in the same manner as in Example 5, except that the amount of alumina used was increased to 600 parts by weight. On measuring the viscosity of the composition using a B-type rotary viscometer, it was 1040 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 3.

Example 8

An addition-curable silicone rubber composition was prepared in the same manner as in Example 5, except that the amount of alumina used was increased to 800 parts by weight. On measuring the viscosity of the composition using a B-type rotary viscometer, it was 12,500 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 3.

Example 9

An addition-curable silicone rubber composition was prepared in the same manner as in Example 5, except that 500 parts by weight of the alumina powder was replaced with 100 parts by weight of a hexagonal boron nitride powder [KBN(h)-10 produced by Shin-Etsu Chemical Co., Ltd.]. On measuring the viscosity of the composition using a B-type rotary viscometer, it was 990 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 3.

Example 10

An addition-curable silicone rubber composition was prepared in the same manner as in Example 5, except that 500 parts by weight of the alumina powder was replaced with 300 parts by weight of a aluminum nitride powder (ALNEL A-100 produced by Advanced Refractory Technologies Inc.). On measuring the viscosity of the composition using a B-type rotary viscometer, it was 356 P.

Then, the composition was cured in the same manner as in Example 5 to produce a cured product. The resulting cured product was tested for the state of sedimentation and separation of the filler, the physical properties as a rubber, the electrical properties, etc. The results are shown in Table 3.

TABLE 3

|  | Ex. 5 | Ex. 6 | Ex. 7 | Ex. 8 | Ex. 9 | Ex. 10 |
| --- | --- | --- | --- | --- | --- | --- |
| Viscosity (P) | 600 | 620 | 1040 | 12,500 | 990 | 356 |
| Amount of $H_2$ gas generated ($\mu$l/g) | 19 | 20 | 18 | 20 | 20 | 20 |
| Hardness (JIS-A) | 87 | 87 | 90 | 95 | 63 | 67 |
| Tensile strength (kgf/cm$^2$) | 61 | 65 | 55 | 40 | 22 | 22 |
| Elongation (%) | 45 | 40 | 50 | 15 | 114 | 85 |
| Volume resistivity ($\Omega$ cm) | $7 \times 10^{15}$ | $6 \times 10^{15}$ | $8 \times 10^{15}$ | $7 \times 10^{15}$ | $4 \times 10^{15}$ | $2 \times 10^{15}$ |
| Dielectric breakdown (kv/mm) | 27 | 27 | 16 | 26 | 25 | 12 |
| Dielectric constant [50 Hz] | 5.6 | 5.6 | 6.2 | 6.5 | 4.3 | 6.2 |
| Dielectric dissipation factor [50 Hz] | $2.7 \times 10^{-3}$ | $2.7 \times 10^{-3}$ | $2.7 \times 10^{-3}$ | $2.7 \times 10^{-3}$ | $2.7 \times 10^{-3}$ | $2.7 \times 10^{-3}$ |
| Thermal conductivity (cal/cm. sec. ° C.) | $3.3 \times 10^{-3}$ | $3.3 \times 10^{-3}$ | $4.3 \times 10^{-3}$ | $5.0 \times 10^{-3}$ | $3.6 \times 10^{-3}$ | $3.2 \times 10^{-3}$ |
| Separation and sedimentation due to lapse of time | | | | | | |
| 5° C./7 days | No sedimentation | No sedimentation | No sedimentation | No sedimentation | No sedimentation | No sedimentation |
| 5° C./15 days | No sedimentation | No sedimentation | No sedimentation | No sedimentation | No sedimentation | No sedimentation |
| 5° C./30 days | No sedimentation | No sedimentation | No sedimentation | No sedimentation | No sedimentation | No sedimentation |
| 5° C./60 days | No | No | No | No | No | No |

TABLE 3-continued

|  | Ex. 5 | Ex. 6 | Ex. 7 | Ex. 8 | Ex. 9 | Ex. 10 |
|---|---|---|---|---|---|---|
|  | sedimentation | sedimentation | sedimentation | sedimentation | sedimentation | sedimentation |
| Adhesion (after 150° C./4 hrs) |  |  |  |  |  |  |
| To Ni | ○ | ○ | ○ | ○ | ○ | ○ |
| To Al | ○ | ○ | ○ | ○ | ○ | ○ |
| To Si | ○ | ○ | ○ | ○ | ○ | ○ |
| To Cu | ○ | ○ | ○ | ○ | ○ | ○ |
| To acid-etched Cu | ○ | ○ | ○ | ○ | ○ | ○ |

TABLE 4

|  | Comp. Ex. 5 | Comp. Ex. 6 | Comp. Ex. 7 |
|---|---|---|---|
| Viscosity (P) | 760 | 300 | 720 |
| Amount of $H_2$ gas generated ($\mu$l/g) | 290 | 18 | 19 |
| Hardness (JIS-A) | 86 | 73 | 71 |
| Tensile strength (kgf/cm$^2$) | 45 | 40 | 36 |
| Elongation (%) | 30 | 65 | 105 |
| Volume resistivity ($\Omega$ cm) | $3 \times 10^{15}$ | $2 \times 10^{14}$ | $2 \times 10^{14}$ |
| Dielectric breakdown (kv/mm) | 23 | 25 | 24 |
| Dielectric constant [50 Hz] | 5.7 | 4.6 | 5.3 |
| Dielectric dissipation factor [50 Hz] | $3 \times 10^{-3}$ | $2 \times 10^{-3}$ | $2 \times 10^{-3}$ |
| Thermal conductivity (cal/cm.sec.° C.) | $3.1 \times 10^{-3}$ | $3.2 \times 10^{-3}$ | $2.6 \times 10^{-3}$ |
| Separation and sedimentation due to lapse of time |  |  |  |
| 5° C./7 days | No sedimentation | Sedimentation occurred | No sedimentation |
| 5° C./15 days | No sedimentation | Sedimentation occurred | Sedimentation occurred |
| 5° C./30 days | No sedimentation | Sedimentation occurred | Sedimentation occurred |
| 5° C./60 days | No sedimentation | Sedimentation occurred | Sedimentation occurred |
| Adhesion (after 150° C./4 hrs) |  |  |  |
| To Ni | x | x | x |
| To Al | x | x | x |
| To Si | x | x | Δ |
| To Cu | x | x | x |
| To acid-etched Cu | x | x | x |

What is claimed is:

1. A zinc oxide-filled addition-curable silicone rubber composition comprising:
   (A) a diorganopolysiloxane containing at least two alkenyl groups in its molecule,
   (B) an organhydrogenpolysiloxane containing at least two hydrogen atoms bonded to silicon atoms in its molecule,
   (C) a platinum family metal catalyst, and
   (D) a zinc oxide powder surface treated with at least one compound selected from the group consisting of a tetraalkoxy silane and a partial hydrolysis-condensation product of the tetraalkoxy silane,
   wherein component (B) is present in such an amount that silicon atoms-bonded hydrogen atoms contained in component (B) are 0.5 to 5 mole per mole of the alkenyl groups contained in component (A), the amount of component (C) is 0.1 to 1,000 ppm in terms of the weight of platinum family metal, and the amount of component (D) is 5 to 300 parts by weight per 100 parts by weight of component (A).

2. The composition of claim 1, wherein the diorganopolysiloxane of component (A) comprises compounds represented by the following general formula (1):

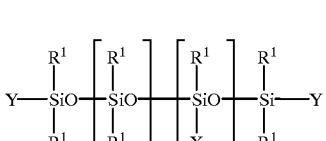

wherein $R^1$ is independently an unsubstituted or substituted monovalent hydrocarbon group free of aliphatic unsaturated bonds, X is an alkenyl group, Y is an alkenyl group or $R^1$, n is an integer of 0, 1 or more, and m is an integer of 0, 1 or more, provided that at least two alkenyl groups bonded to silicon atoms are present in the molecule.

3. The composition of claim 1, wherein the organohydrogenpolysiloxane of component (B) comprises compounds represented by the following average compositional formula (2):

$$H_a R^2_b SiO_{(4-a-b)/2} \tag{2}$$

wherein $R^2$ is independently an unsubstituted or substituted monovalent hydrocarbon group free of aliphatic unsaturated bonds; a and b are a number satisfying $0<a<2$, $0.7 \leq b \leq 2$ and $0.8 \leq a+b \leq 3$.

4. The composition of claim 1, wherein the tetraalkoxysilane present in the surface treated zinc oxide of component (D) comprises one represented by the following general formula (7):

$$Si(OR^3)_4 \tag{7}$$

wherein $R^3$ is independently an unsubstituted or lower-alkoxy-substituted alkyl group, and the partial hydrolysis-condensation product of the tetraalkoxysilane in the surface treated zinc oxide of component (D) comprises one represented by the following average compositional formula (8):

$$[(OR^3)_3SiO_{1/2}]_K[(OR^3)_2SiO_{2/2}]_L[(OR^3)SiO_{3/2}]_M[SiO_{4/2}]_N \tag{8}$$

wherein $R^3$ is as defined in said general formula (7), K, L, M and N are a number satisfying $K+L+M+N=1$, $0.002 \leq K \leq 1$, $0 \leq L \leq 0.998$, $0 \leq M \leq 0.998$ and $0 \leq N \leq 0.35$.

5. The composition of claim 1, further comprising (E) a high thermal-conductive filler.

6. The composition of claim 5, wherein the high thermal-conductive filler of component (E) is at least one compound selected from the group consisting of ceramics fillers and metal powders.

7. The composition of claim 5, wherein the amount of component (E) is up to 1,000 parts by weight per 100 parts by weight of component (A).

8. A cured product obtained by curing the composition of claim 1.

9. A cured product obtained by curing the composition of claim 5.

* * * * *